US011806799B1

(12) United States Patent
Imbrogno et al.

(10) Patent No.: US 11,806,799 B1
(45) Date of Patent: Nov. 7, 2023

(54) SINTER BRAZING OF POWDERED METAL SINTER HARD MATERTIAL COMPONENT TO A WROUGHT STEEL COMPONENT

(71) Applicant: Keystone Powdered Metal Company, St. Marys, PA (US)

(72) Inventors: Peter G. Imbrogno, Dubois, PA (US); Kevin A. Bauer, St. Marys, PA (US)

(73) Assignee: Keystone Powdered Metal Company, St. Marys, PA (US)

( * ) Notice: Subject to any disclaimer, the term of this patent is extended or adjusted under 35 U.S.C. 154(b) by 200 days.

(21) Appl. No.: 17/231,362

(22) Filed: Apr. 15, 2021

Related U.S. Application Data

(60) Provisional application No. 63/011,238, filed on Apr. 16, 2020.

(51) Int. Cl.
| | |
|---|---|
| *B23K 1/19* | (2006.01) |
| *C22C 30/02* | (2006.01) |
| *C22C 38/22* | (2006.01) |
| *C22C 38/20* | (2006.01) |
| *C22C 38/04* | (2006.01) |
| *B23K 35/30* | (2006.01) |
| *C21D 6/00* | (2006.01) |
| *C22C 38/08* | (2006.01) |
| *B23K 103/04* | (2006.01) |

(52) U.S. Cl.
CPC ............. *B23K 1/19* (2013.01); *B23K 35/302* (2013.01); *B23K 35/3033* (2013.01); *C21D 6/001* (2013.01); *C21D 6/002* (2013.01); *C21D 6/005* (2013.01); *C22C 30/02* (2013.01); *C22C 38/04* (2013.01); *C22C 38/08* (2013.01); *C22C 38/20* (2013.01); *C22C 38/22* (2013.01); *B23K 2103/04* (2018.08)

(58) Field of Classification Search
None
See application file for complete search history.

(56) References Cited

U.S. PATENT DOCUMENTS

| | | | | | |
|---|---|---|---|---|---|
| 3,717,442 | A | * | 2/1973 | Knopp ................... | B23K 35/24 420/587 |
| 4,029,476 | A | * | 6/1977 | Knopp ................... | C22C 30/02 428/676 |
| 2006/0275607 | A1 | * | 12/2006 | Demir ....................... | B22F 7/06 428/408 |

OTHER PUBLICATIONS

Tempering (metallurgy) Wikipedia (Year: 2020).*
Ferrous Powder Metallurgy Materials Pressed and Sintered Parts (Year: 1998).*
Effect of Sintering Time and Cooling Rate On Sinter Hardenable Materials Mary Schmidt (Year: 2004).*
High Density Processing Of Cr—Mn P/M Steels R. J. Causton and T. M. Cimino International Conference & Exhibition on Powder Metallurgy & Particulate Materials (Year: 1994).*

* cited by examiner

*Primary Examiner* — Jenny R Wu
(74) *Attorney, Agent, or Firm* — Alvin T. Rockhill

(57) ABSTRACT

This invention discloses a method of manufacturing a desired metal part which comprises (1) providing an powder metal sinterbraze hard steel component and a wrought steel stamping component; (2) affixing the powder metal hard steel component and the wrought steel stamping component together with a brazing filler metal being alloyed at the interface between the powder metal hard steel component and the wrought steel stamping component; (3) sinter brazing the powder metal hard steel component and the wrought steel stamping component together to produce an in-process metal part; and (4) tempering the in-process metal part to produce the desired metal part.

20 Claims, No Drawings

SINTER BRAZING OF POWDERED METAL SINTER HARD MATERTIAL COMPONENT TO A WROUGHT STEEL COMPONENT

This application claims the benefit of United States Provisional Patent Application Ser. No. 63/011,238, filed on Apr. 16, 2020. The teachings of U.S. Provisional Patent Application Ser. No. 63/011,238 are incorporated by reference herein in their entirety.

BACKGROUND OF THE INVENTION

Powder metal parts are made by compacting a metal powder composition into a desired shape in a die to produce a green metal part. The green metal part is then sintered at an elevated temperature to produce the powder metal part. Powder metal parts offer the advantage of being able to be formed into parts having intricate designs that frequently cannot be made by casting, forging or machining. In high volume applications, powder metal parts can typically be made at a reduced cost as compared to parts of similar design wherein machining is required. Accordingly, for economic and practical reasons, powdered metal parts are commonly used in a wide variety of applications.

In manufacturing some metal parts it can be advantageous to attach a powder metal component of the part to a wrought steel stamping. To attain desired performance characteristics it can also be desirable for the formation of martensite to occur in the powder metal component of the part. Additionally, it can be desirable for the brazing, sintering and hardening to take place in a single step, such as in a sintering furnace.

SUMMARY OF THE INVENTION

This invention discloses a method of manufacturing a desired metal part which comprises (1) providing an powder metal sinterbraze/sinter hardening steel component and a wrought steel stamping component; (2) affixing the powder metal sinter hard steel component and the wrought steel stamping component together with a brazing filler metal being alloyed at the interface between the powder metal sinter hard steel component and the wrought steel stamping component; (3) sinter brazing/sinter hardening the powder metal hard steel component and the wrought steel stamping component together to produce an in-process metal part; and (4) tempering the in-process metal part to produce the desired metal part.

DETAILED DESCRIPTION OF THE INVENTION

The powder metal sinterbraze/sinter hard steel component utilized in the practice of this invention can be comprised of 0.4 to 0.9 weight percent carbon, 0.15 to 1.7 molybdenum, 0.05 to 0.3 weight percent manganese, and 1.0 to 7.0 weight percent nickel. Such a composition can be further comprised of 0.5 to 3.0 weight percent copper.

In another embodiment of this invention the powder metal sinterbraze/sinter hard steel component utilized in the practice of this invention can comprised of 0.4 to 0.9 weight percent carbon, 0.15 to 1.7 molybdenum, 0.05 to 0.3 weight percent manganese, and 1.0 to 3.5 weight percent chromium. Such a composition can be further comprised of 1.0 to 3.0 weight percent copper.

Some representative examples of specific sinter-hardenable steel powders that can be used include compositions which are of the following MPIF designations: FLN2-4408 which is comprised of 0.6 to 0.9 weight percent carbon, 1.0 to 3.0 weight percent nickel, 0.65 to 0.95 molybdenum, 0.05 to 0.3 weight percent manganese; FLN4-4408 which is comprised 0.6 to 0.9 weight percent carbon, 3.0 to 5.0 weight percent nickel, 0.65 to 0.95 molybdenum, 0.05 to 0.3 weight percent manganese; FLN6-4408 which is comprised of 0.6 to 0.9 weight percent carbon, 5.0 to 7.0 weight percent nickel, 0.65 to 0.95 molybdenum, and 0.05 to 0.3 weight percent manganese; FLNC-4408 which is comprised of 0.6 to 0.9 weight percent carbon, 1.0 to 3.0 weight percent nickel, 0.65 to 0.95 molybdenum, 1.0 to 3.0 weight percent copper, and 0.05 to 0.3 weight percent manganese; FLC-4608 which is comprised of 0.6 to 0.9 weight percent carbon, 0.6 to 2.0 weight percent nickel, 0.43 to 0.60 molybdenum, 1.0 to 3.0 weight percent copper, and 0.05 to 0.3 weight percent manganese; FLC-4805 which is comprised of 0.5 to 0.7 weight percent carbon, 1.2 to 1.6 weight percent nickel, 1.1 to 1.4 molybdenum, 0.7 to 1.4 weight percent copper, and 0.3 to 0.5 weight percent manganese; FLC2-4808 which is comprised of 0.6 to 0.9 weight percent carbon, 1.2 to 1.5 weight percent nickel, 1.1 to 1.4 molybdenum, 1.0 to 3.0 weight percent copper, and 0.3 to 0.5 weight percent manganese; FLC-4908 which is comprised of 0.6 to 0.9 weight percent carbon, 1.3 to 1.7 molybdenum, 1.0 to 3.0 weight percent copper, and 0.05 to 0.3 weight percent manganese; FLC2-5208 which is comprised of 0.6 to 0.8 weight percent carbon, 0.15 to 0.30 molybdenum, 1.0 to 3.0 weight percent copper, 0.05 to 0.3 weight percent manganese, and 1.3 to 1.7 weight percent chromium; and FL-5305 which is comprised of 0.4 to 0.6 weight percent carbon, 0.4 to 0.6 molybdenum, 0.05 to 0.3 weight percent manganese, and 2.7 to 3.3 weight percent chromium.

The brazing filler metal utilized in the practice of this invention can be comprised of 35 to 45 weight percent copper, 36 to 46 weight percent nickel, 1.3 to 2.3 weight percent silicon, 12 to 18 weight percent manganese, and 1.2 to 1.8 weight percent boron. It is typically comprised of 37 to 43 weight percent copper, 38 to 44 weight percent nickel, 1.5 to 2.1 weight percent silicon, 13 to 17 weight percent manganese, and 1.3 to 1.7 weight percent boron. The brazing filler metal is more typically comprised of 39 to 41 weight percent copper, 40 to 42 weight percent nickel, 1.6 to 1.9 weight percent silicon, 14 to 16 weight percent manganese, and 1.4 to 1.6 weight percent boron.

The wrought steel stamping is made by being cast into a solid form which is subsequently worked, by stamping and optionally additional machining, into a final form. Accordingly, the term "wrought metal" characterizes a full density metal that comes from a molten (liquid) metal rather than being made by powder metal technology. The term "wrought metal" is used to characterize full density metal that comes from molten (liquid) metal in contrast to being made by powder metal technology. Wrought metal components of a part can be easily distinguished from components made by powder technology on the basis of both their microstructure and apparent hardness.

The sinter brazing/sinter hardening is carried out under conditions that include a preheating step, a main heating step, and a rapid cooling step. The preheating step is carried out at a temperature which is within the range of 1550° F. to 1750° F., is typically carried out at a temperature which is within the range of 1600° F. to 1750° F., is more carried out at a temperature which is within the range of 1650° F. to 1750° F., and is preferably carried out at a temperature which is within the range of 1700° F. to 1750° F.

The main heating step follows the preheating step and is carried out at a temperature which is above the melting point of the brazing filler metal. The main heating step is carried out at a temperature which is within the range of 2040° F. to 2100° F., will more typically be carried out at a temperature which is within the range of 2050° F. to 2090° F., and is preferably carried out at a temperature which is within the range of 2060° F. to 2080° F.

The rapid cooling step (quenching step) follows the main heating step and is carried out at a cooling rate which is within the range of 50° F./minute to 200° F./minute, which is more typically carried out at a cooling rate which is within the range of 70° F./minute to 150° F./minute, which is preferably carried out at a cooling rate which is within the range of 80° F./minute to 130° F./minute, and which is more preferably carried out at a cooling rate which is within the range of 85° F./minute to 120° F./minute, and which is most preferably carried out at a cooling rate which is within the range of 90° F./minute to 110° F./minute.

After being quenched the metal part is tempered to attain a higher level of toughness by decreasing the hardness of the metal. This reduction in hardness makes the metal less brittle and increases its ductility. The temperature at which the metal part is tempered will be below its lower critical temperature (lower transformation temperature) or lower arrest $A_1$ temperature. In any case the metal part will be tempered at a temperature at which ferrite and cementite in the metal can combine to form the desired level of austenite. It is important that the tempering temperature never exceed the lower transformation temperature to avoid the destruction of martensite. The tempering temperature employed and the time at which the metal part is maintained at the tempering temperature will depend upon the precise composition of metal and the desired level of austenite (ultimate properties of the metal part). In general, low tempering temperatures relieve the internal stresses and decreasing brittleness while maintaining the hardness of the part. Higher tempering temperatures tend to produce a greater reduction in the hardness while compromising tensile strength and yield strength to attain increased levels of elasticity and plasticity. In any case, the quenched metal part can be tempered at a temperature which is within the range of about 150° F. to about 1,100° F. and are typically tempered at a temperature which is within the range of about 300° F. to about 650° F.

Tempering the metal part at very low temperatures which are within the range of 150° F. and 300° F. will normally provide some reduction in internal stresses and tempering at higher temperatures which are within the range of 300° F. to 400° F. will provide a much higher level of stress reduction and a consequential slight reduction in hardness. Tempering at temperatures which are within the range of 500° F. and 650° F. will typically result in a decrease in ductility and an increase in brittleness. Parts requiring more strength than toughness, such as tools, are usually not tempered at temperatures above about 400° F. In cases where increased toughness is desired at the expense of strength, higher tempering temperatures which are within the range of about 700° F. to about 1000° F. can be used. Tempering at even higher temperatures which are within the range of 1,000° F. to 1,100° F. produce a very high level of toughness, but at a serious reduction in strength and hardness While certain representative embodiments and details have been shown for the purpose of illustrating the subject invention, it will be apparent to those skilled in this art that various changes and modifications can be made therein without departing from the scope of the subject invention.

What is claimed is:

1. A method of manufacturing a desired metal part which comprises (1) providing a powder metal sinter hard steel component and a wrought steel stamping component; (2) affixing the powder metal sinter hard steel component and the wrought steel stamping component together with a brazing filler metal being alloyed at the interface between the powder metal sinter hard steel component and the wrought steel stamping component; (3) sinter brazing and sinter hardening the powder metal sinter hard steel component and the wrought steel stamping component together to produce an in-process metal part, wherein the sinter brazing and sinter hardening is carried out under conditions that include a preheating step, a main heating step, and a rapid cooling step, wherein the preheating step is carried out at a temperature which is within the range of 1550° F. to 1750° F., wherein the main heating step is carried out at a temperature which is above the melting point of the brazing filler metal at a temperature which is within the range of 2040° F. to 2100° F.; and (4) tempering the in-process metal part to produce the desired metal part.

2. The method as specified in claim 1 wherein the sinter brazing step is conducted under conditions which result in the formation of martensite in the powder metal component of the part.

3. The method as specified in claim 1 wherein the preheating step is carried out at a temperature which is within the range of 1700° F. to 1750° F.

4. The method as specified in claim 1 wherein the main heating step is carried out at a temperature which is within the range of 2060° F. to 2080° F.

5. The method as specified in claim 1 wherein the rapid cooling step is carried out at a cooling rate which is within the range of 50° F./minute to 200° F./minute.

6. The method as specified in claim 1 wherein the rapid cooling step is carried out at a cooling rate which is within the range of 90° F./minute to 110° F./minute.

7. The method as specified in claim 1 wherein the powder metal sinter hard steel is comprised of 0.4 to 0.9 weight percent carbon, 0.15 to 1.7 molybdenum, 0.05 to 0.3 weight percent manganese, 1.0 to 7.0 weight percent nickel, and 0.5 to 3.0 weight percent copper.

8. The method as specified in claim 1 wherein the powder metal sinter hard steel is comprised of 0.4 to 0.9 weight percent carbon, 0.15 to 1.7 molybdenum, 0.05 to 0.3 weight percent manganese, 1.0 to 3.5 weight percent chromium, and 1.0 to 3.0 weight percent copper.

9. The method as specified in claim 1 wherein the powder metal sinter hard steel is comprised of 0.6 to 0.9 weight percent carbon, 1.0 to 7.0 weight percent nickel, 0.65 to 0.95 molybdenum, 0.05 to 0.3 weight percent manganese.

10. The method as specified in claim 1 wherein the powder metal sinter hard steel is comprised of 0.6 to 0.9 weight percent carbon, 0.6 to 3.0 weight percent nickel, 0.43 to 0.95 molybdenum, 1.0 to 3.0 weight percent copper, and 0.05 to 0.3 weight percent manganese.

11. The method as specified in claim 1 wherein the powder metal sinter hard steel is comprised of 0.5 to 0.7 weight percent carbon, 1.2 to 1.6 weight percent nickel, 1.1 to 1.4 molybdenum, 0.7 to 1.4 weight percent copper, and 0.3 to 0.5 weight percent manganese.

12. The method as specified in claim 1 wherein the powder metal sinter hard steel is comprised of 0.6 to 0.9 weight percent carbon, 1.2 to 1.5 weight percent nickel, 1.1 to 1.4 molybdenum, 1.0 to 3.0 weight percent copper, and 0.3 to 0.5 weight percent manganese.

13. The method as specified in claim 1 wherein the powder metal sinter hard steel is comprised of 0.6 to 0.9 weight percent carbon, 1.3 to 1.7 molybdenum, 1.0 to 3.0 weight percent copper, and 0.05 to 0.3 weight percent manganese.

14. The method as specified in claim 1 wherein the powder metal sinter hard steel is comprised of 0.6 to 0.8 weight percent carbon, 0.15 to 0.30 molybdenum, 1.0 to 3.0 weight percent copper, 0.05 to 0.3 weight percent manganese, and 1.3 to 1.7 weight percent chromium.

15. The method as specified in claim 1 wherein the brazing filler metal is comprised of 35 to 45 weight percent copper, 36 to 46 weight percent nickel, 1.3 to 2.3 weight percent silicon, 12 to 18 weight percent manganese, and 1.2 to 1.8 weight percent boron.

16. A metal part which is made by the method specified in claim 1.

17. The method as specified in claim 1 wherein the rapid cooling step is carried out at a cooling rate which is within the range of 70° F./minute to 150° F./minute.

18. The method as specified in claim 1 wherein the rapid cooling step is carried out at a cooling rate which is within the range of 80° F./minute to 130° F./minute.

19. The method as specified in claim 1 wherein the brazing filler metal is comprised of 37 to 43 weight percent copper, 38 to 44 weight percent nickel, 1.5 to 2.1 weight percent silicon, 13 to 17 weight percent manganese, and 1.3 to 1.7 weight percent boron.

20. The method as specified in claim 1 wherein the brazing filler metal is comprised of 39 to 41 weight percent copper, 40 to 42 weight percent nickel, 1.6 to 1.9 weight percent silicon, 14 to 16 weight percent manganese, and 1.4 to 1.6 weight percent boron.

\* \* \* \* \*

UNITED STATES PATENT AND TRADEMARK OFFICE
CERTIFICATE OF CORRECTION

PATENT NO. : 11,806,799 B1
APPLICATION NO. : 17/231362
DATED : November 7, 2023
INVENTOR(S) : Peter G. Imbrogno and Kevin A. Bauer It is certified that error appears in the above-identified patent and that said Letters Patent is hereby corrected as shown below:

On the Title Page

In the Title, Item (54), Line 2, "MATERTIAL" should read --MATERIAL--

In the Specification

In Column 1, Line 2 of the Title, "MATERTIAL" should read --MATERIAL--

Signed and Sealed this
Twenty-first Day of May, 2024

Katherine Kelly Vidal
*Director of the United States Patent and Trademark Office*